United States Patent [19]

Heiter et al.

[11] Patent Number: 5,046,900

[45] Date of Patent: Sep. 10, 1991

[54] HAND DRILLING TOOL FOR DRILLING OUT SPOT WELDS

[75] Inventors: Uwe Heiter, Villingen-Schwenningen; Josef Schill, Bad Dürrheim, both of Fed. Rep. of Germany

[73] Assignee: MV Marketing & Vertriebs GmbH Wielaender & Schill, Fed. Rep. of Germany

[21] Appl. No.: 573,390

[22] Filed: Aug. 24, 1990

[30] Foreign Application Priority Data

Apr. 5, 1990 [DE] Fed. Rep. of Germany ... 9003950[U]

[51] Int. Cl.$^5$ .............................................. B23B 45/14
[52] U.S. Cl. ........................................ 408/84; 408/136
[58] Field of Search ..................... 408/84, 98, 99, 108, 408/136

[56] References Cited

U.S. PATENT DOCUMENTS

| 2,296,087 | 9/1942 | Burns, Sr. ............................ 408/84 X |
| 2,696,129 | 12/1954 | Riblet .................................... 408/99 |
| 3,538,794 | 11/1970 | Grundmeyer ...................... 408/99 X |
| 4,136,579 | 1/1979 | Robinson et al. ............... 408/136 X |

FOREIGN PATENT DOCUMENTS 2915429 10/1980 Fed. Rep. of Germany ...... 408/108

Primary Examiner—Z. R. Bilinsky
Attorney, Agent, or Firm—Gifford, Groh, Sprinkle, Patmore and Anderson

[57] ABSTRACT

In a hand drilling tool, in particular for drilling out spot welds, comprising a bracing support means which is releasably mounted to the body of the drilling machine and which is displaceable in the direction of the drilling axis by way of an actuating lever which terminates in a handle, it is provided that the lever (4) acts on a fitment sleeve (6) which embraces the body (2) of the drilling machine and on which the bracing support means (3) is mounted and that the fitment sleeve (6) is adapted to be axially displaceable with respect to the body (2) of the drilling machine. To eliminate moments the axis of the lever which acts on the fitment sleeve intersects the axis of the body of the drilling machine.

15 Claims, 1 Drawing Sheet

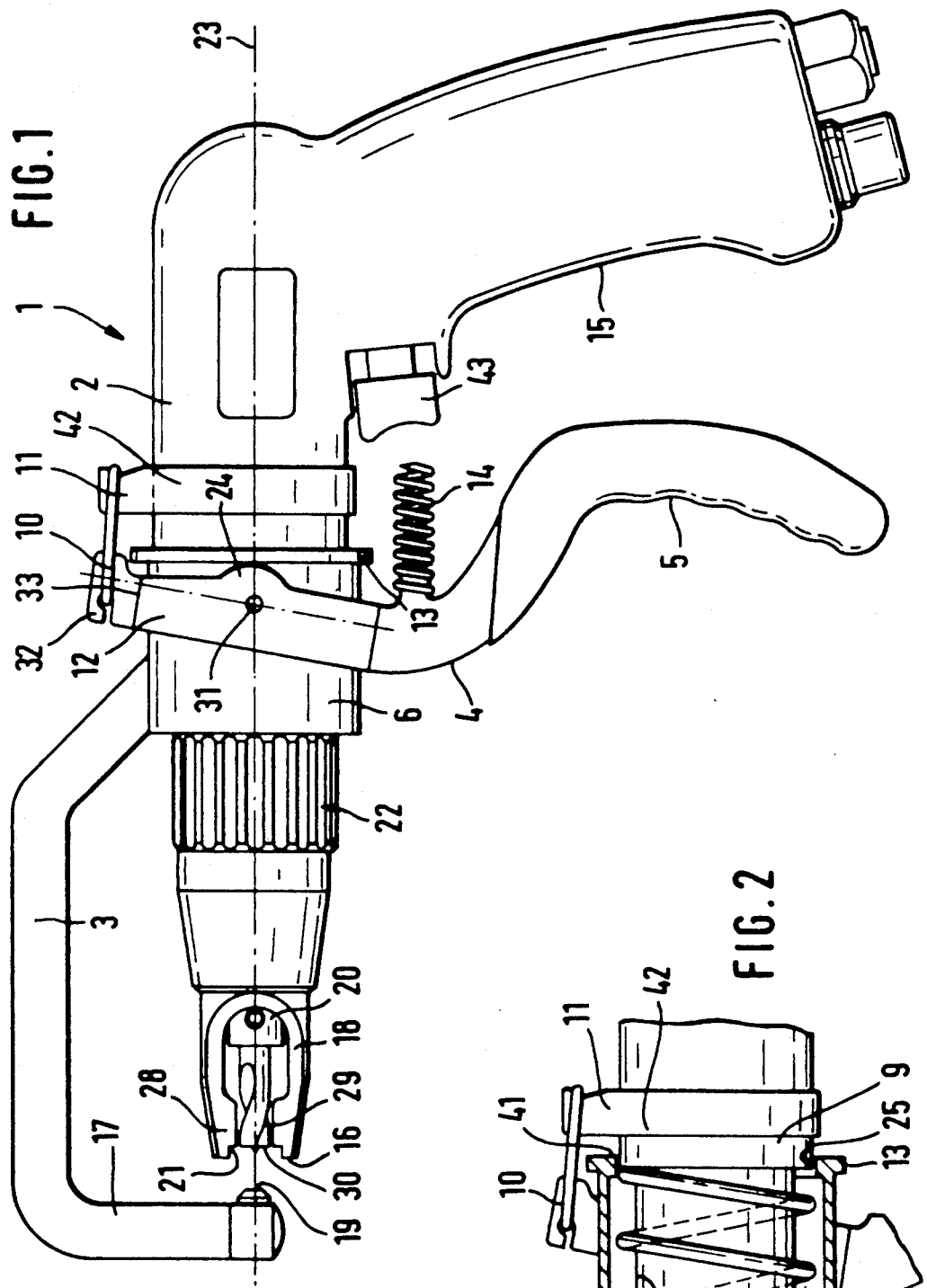

HAND DRILLING TOOL FOR DRILLING OUT SPOT WELDS

The invention relates to a hand drilling tool, in particular for drilling out spot welds, comprising a bracing support means which is releasably mounted to the drilling machine body and which is displaceable in the direction of the drilling axis by way of an actuating lever which terminates in a handle.

EP-A-0 102 412 discloses a hand drilling tool for drilling out spot welds. In that arrangement a bracing support means is fixedly connected to the body of the drilling machine by means of a clamping ring. The actuating lever is secured to a limb portion of the bracing support loop member and to the clamping sleeve by means of a connection parallel to the drilling axis, by way of the body of the drilling machine. That arrangement suffers from the disadvantage that the bracing support member cannot be removed from the body of the drilling machine and moments which give rise to difficulties are produced upon actuation of the assembly. German laid-open application (DE-OS) No. 26 52 930 discloses a drilling-out apparatus comprising a hand drill and a bracing support loop member which extends at one side of the tool. That arrangement suffers from the disadvantage that upon actuation of the bracing support means, forces act only at one side and outside the body of the drilling machine, thus resulting in disadvantageous moments being produced. In the known tool the bracing support member is admittedly releasably mounted to the body of the drilling machine, but it can only be removed therefrom again by a complicated procedure. A further disadvantage of the arrangement is that handling thereof is really complicated.

The device disclosed in German laid-open application (DE-OS) No. 22 40 066 also has a releasable bracing support loop member, with the bracing support loop member being arranged laterally on the tool, with a lever assembly, by way of a clamping ring. By virtue of that configuration, disadvantageous moments also occur upon operation of the assembly, and the lever and the tool cannot be operated with one hand.

Accordingly the invention is based on the object of providing a hand drilling tool for drilling out spot welds in which the bracing support means can be removed quickly and without involving assembly time, in which the forces act on the body of the drilling machine by way of the fitment sleeve directly on the drilling axis and as a result do not produce any moments, in which the bracing support member and the fitment sleeve form a physical unit and are arranged rotatably on the body of the drilling machine, and the arrangement can be easily operated with one hand.

The invention provides that, in a hand drilling tool of the kind set forth in the opening part of this specification, a lever acts on a fitment sleeve which embraces the body of the drilling machine and on which the bracing support means is mounted, and that the fitment sleeve is adapted to be axially displaceable with respect to the body of the drilling machine. In that arrangement, the axis of the lever which engages the fitment sleeve intersects the axis of the body of the drilling machine, to eliminate moments.

Desirably a spring urges the fitment sleeve in a forward direction. The spring advantageously comprises a coil spring which is arranged in the interior of the fitment sleeve and which embraces the body of the drilling machine and which is supported at the front end against a guide flange, the inside diameter of which corresponds to the outside diameter of the body of the drilling machine and the rearward end of which comes to lie against an abutment on the body of the drilling machine.

An advantageous embodiment provides that the abutment on the body of the drilling machine is in the form of a guide ring, the outside diameter of which corresponds to the inside diameter of the guide sleeve.

A development provides that disposed at the end of the lever which is in opposite relationship to the handle is a holding member which is engaged to a support means on the body of the drilling machine and can thus be removed in a flash without involving the use of aids. In that arrangement the set drilling depth is constant with or without the bracing support, that is to say the depth of drilling remains unaffected. In that connection the holding member advantageously comprises a ring and the support means comprises a hook into which the ring can be engaged upon a movement of the fitment sleeve in opposition to the spring force.

In that connection, an advantageous development provides that at the end in opposite relationship to the handle the lever terminates in two arms which are of semi-annular configuration and which embrace the fitment sleeve and which preferably bear in a cam-like configuration against the flange which projects at a rearward end of the fitment sleeve.

So that the tool can be adapted to specific operating parameters in terms of space, the fitment sleeve is rotatable with respect to the lever.

A development is characterised in that in front of the lever handle the lever operates the on button of the machine by means of a spring and sets the machine in operation and that upon actuation the lever handle preferably comes to lie in a recess on the handle of the drilling machine.

In order to prevent the drilling tool from slipping away sideways, the end face of the depth gauge which is in opposite relationship to the bracing support is provided with grooves.

A further development of the subject-matter of the invention provides that the bracing support means is provided with an adjusting screw as the bracing support which is in opposite relationship to the depth gauge.

Desirably, a rotary ring is disposed between the fitment sleeve and the drilling chuck for setting the drill in accordance with a marking, preferably in the form of a notch or groove.

An advantageous configuration according to the invention further provides that the fitment sleeve carries bracing supports of different loop-like configurations, for different working operations. Advantageously the forces acting on the lever are increased by a step-up arrangement to provide an increased contact pressure at the bracing support.

The invention will now be described in greater detail by means of an embodiment with reference to the accompanying drawings in which:

FIG. 1 is a side view of the hand drilling tool according to the invention, and

FIG. 2 is a view in longitudinal section through the fitment sleeve shown in FIG. 1.

Referring to FIG. 1, illustrated therein is an embodiment comprising a pneumatic hand drilling machine 1 and a bracing support means 3. The bracing support means 3 includes a lever 4 which engages a fitment sleeve 6 connected to a bracing support loop member 17. The axis 31 of the lever intersects the axis 23 of the body 2 of the drilling machine. The fitment sleeve 6 is adapted to be axially displaceable with respect to the body 2 of the drilling machine.

The lever 4 has a handle 5 and at the end 32 in opposite relationship thereto, can be provided with two arms 12 which are of a semi-annular configuration and which embrace the fitment sleeve 6. The arms 12 are connected together for example by a clamp member or by a holding ring 10. The arms 12 which embrace the fitment sleeve 6 bear with a cam portion 24 against a flange 13 which projects at the rearward end of the fitment sleeve 6. The cam portions 24 are disposed at a spacing of 180° relative to each other. The flange 13 and the cam-like outwardly extending portions 24 form the transmission path by way of which the lever forces upon actuation of the lever handle 5 are transmitted to the fitment sleeve 6 and therewith to the bracing support loop member 17. In that arrangement the fitment sleeve 6 is adapted to be axially displaceable with respect to the body 2 of the drilling machine.

The holding member 10 provided at the end 32 in opposite relationship to the handle 5 on the lever 4 is engaged to a support means 11 on the body 2 of the drilling machine. The holding member 10 comprises a ring, while the support means 11 is of a hook-like configuration. Upon movement of the fitment sleeve 6 back on to the body 2 of the drilling machine, the ring 10 can be released from the hook 11 and thus the fitment sleeve 6 and therewith the entire bracing support means 3 can be removed from the body 2 of the drilling machine. As can be seen in detail from FIG. 2, the rearward end 32 of the fitment sleeve 6, which is in the form of a flange 13, may have an inwardly disposed, concentrically extending limb portion 25, the height of which is such that the fitment sleeve 6 can be moved with adequate clearance over an abutment 9 provided in front of the support means 11. The abutment 9 on the body 2 of the drilling machine is in the form of a guide ring in this case. The front end of the fitment sleeve 6 has a guide flange 8, the inside diameter of which corresponds to the outside diameter of the neck portion 26 of the body 2 of the drilling machine. The length of the guide flange 8 is so selected that the contact surface 27 is sufficiently large to guide the fitment sleeve 6 on the neck portion 26 of the drilling machine and to prevent the bracing support means 3 from tilting. A coil spring 7 is fitted into the space inside the fitment sleeve 6, which is delimited by the limb portion 25 and the guide flange 8. In that arrangement the front end of the spring 7 comes to bear against the inside of the guide flange 8, while the rear turn of the spring is compressed somewhat in regard to its periphery by means of the limb portion 25 and therefore comes to lie better against the outside of the abutment 9.

When the bracing support means 3 is fitted into position, the fitment sleeve 6 is moved in opposition to the spring pressure in the direction of the support means 11 until the spring 10 can be fitted over the hook of the support means 11. After the ring 10 has been engaged into the hook 11, the spring 7 is relieved somewhat, but it stores sufficient compression energy to urge the fitment sleeve 6 forwardly towards the tip of the drill. In that way the ring 10 is pulled fast against the hook 11.

In that manner the bracing support means 3 can be fixed in position and removed without any assembly operations or releasing of screws and the like, simply by a hooking engagement operation. As it is possible to provide different bracing support means 3 for different working operations, with loop members 17 of a suitable configuration, no difficulty is involved in converting the arrangement to perform specific working operations. At any event the hand drilling tool 1 can be adapted without difficulty to the requirements in respect of space during a working operation, insofar as the fitment sleeve 6 is rotatable practically over the entire periphery of the arrangement. In that connection handling of the assembly is extremely simple as no fixing devices or the like have to be released beforehand for the purposes of turning the loop member. The spring 7 disposed in the fitment sleeve 6 provides in that respect that the fitment sleeve 6 and therewith the bracing support means 3 remain in their respective angular positions. The lever 4 is supported against the body 2 of the drilling machine by a spring 14 in front of the lever handle 5 and upon actuation preferably comes to lie in a recess 15 on the handle of the drilling machine.

Upon actuation of the hand drilling tool 1 and therewith the handle 5 in the direction of the handle of the drilling machine, the lever force is transmitted by way of the cam portions 24 to the flange 13 and from there to the fitment sleeve 6 and the bracing support loop member 17 as the head 33 of the lever 4 is held fast to the hook 11 by the ring 10. At the same time the bracing support means 3 is pulled in opposition to the spring pressure over the guide ring 9. The spring pressure is produced by virtue of the spring 7 being pressed against the abutment 9 and the inside of the guide flange 8. The movement of the fitment sleeve 6 ends by the flange 13 thereof coming into contact with an abutment ring 42 which carries the hook 11. At the same time the on button 43 of the machine is actuated by way of the spring 14 which is carried on the lever 4, and the machine is set in operation. In that connection the construction provides a step-up ratio in respect of the forces involved of about 1:4, that is to say for example a force of 10 kg at the lever 5 produces a contact pressure of 40 kg at the bracing support 19. When the working operation is concluded, the lever handle 5 is released again and the bracing support means 3 is urged back into its starting position by the spring force.

In regard to setting the drilling depth on the hand drilling machine 1, the arrangement includes a rotary ring 22 arranged between the drilling chuck 20 and the neck portion 26 of the drilling machine, together with a depth gauge or stop 18. The depth stop 18 comprises two oppositely disposed arms 28, the inside surfaces of which are each in the form of a respective limb portion 29. The limb portion 29 has a radial inward curvature portion within which the tip of the drill rotates. Each limb portion 29 terminates at a predetermined spacing beneath the end face of the depth stop 18 and in that way forms a notch or groove 21 which serves as a marking for setting the depth of drilling. The depth of drilling can be precisely preset by means of a rotary ring 22, with the rotary ring 22 only displacing the depth stop 18, while the drill itself remains immobile. A depth of drilling which is conventionally used for drilling out welds, in particular in the automobile industry, is set when the end face 30 of the drill is aligned with the notch 21 on the depth stop 18.

The invention has thus provided a hand drilling tool which can be applied to drilling points at different depths as the fitment sleeve 6 is rotatable through 360° with respect to the lever and fitment sleeves for different working operations and bracing supports with a different loop configuration are available. The bracing support devices can be easily removed without involving assembly times and the hand drilling took can be conveniently operated with one hand.

We claim:

1. A hand drilling tool for a drilling machine having a drilling axis, in particular for drilling out spot welds, comprising a bracing support means releasably mounted on a body of said drilling machine, said bracing support means being displaceable in the direction of said drilling axis by way of an actuating lever which terminates at one end in a handle, said actuating lever pivotably engaging a fitment sleeve circumscribing said body of said drilling machine, said bracing support means is mounted to said fitment sleeve and is adapted to be axially displaceable with respect to said body of said drilling machine along said drilling axis in response to a pivoting of said actuating lever.

2. The drilling tool as set forth in claim 1 characterised in that said actuating lever is pivotable relative to said fitment sleeve about an axis which intersects said drilling axis.

3. The drilling tool as set forth in claim 2 characterised in that a spring urges said fitment sleeve forwardly.

4. The drilling tool as set forth in claim 3 characterised in that said spring is a coil spring arranged in the interior of said fitment sleeve, said coil spring embraces said body of said drilling machine and is supported at a front end thereof against a guide flange of said fitment sleeve whose inside diameter corresponds to the outside diameter of said body of said drilling machine, said coil spring has a rearward end which comes to bear against an abutment provided on said body of said drilling machine.

5. The drilling tool as set forth in claim 4 characterised in that said abutment provided on said body of said drilling machine is in the form of a guide ring whose outside diameter corresponds to the inside diameter of said fitment sleeve.

6. The drilling tool as set forth in claim 1 characterised in that a holding member is provided on the end of said actuating lever which is opposite said handle and which is pivotably connected to a support means attached to said body of said drilling machine.

7. The drilling tool as set forth in claim 6 characterised in that said holding member comprises a ring connectable between said actuating lever and a support means attached to said drilling machine.

8. The drilling tool as set forth in claim 1 characterised in that said lever has two arms having facing semi-annular configurations and which circumscribe said fitment sleeve, said arms preferably have cam portions which bear against a flange which projects from a rearward end of said fitment sleeve.

9. The drilling tool as set forth in claim 1 characterised in that said fitment sleeve is rotatable with respect to said lever.

10. The drilling tool as set forth in claim 1 characterised in that said actuator lever is pivotably supported relative to said body and is biased away from a handle of said drilling machine by a spring located between said handle of said actuator lever and said handle of said drilling machine said handle of said actuator lever preferably being shaped to lie in a recess provided in said handle of said drilling machine when said actuator lever is actuated.

11. The drilling tool as set forth in claim 1 characterised in that a depth gage is provided at the end of said drilling machine, said depth gage having an end face which is disposed in opposite relationship to a bracing support member of said bracing support means said end face being provided with grooves.

12. The drilling tool as set forth in claim 11 characterised in that said bracing support member of said bracing support means is provided with an adjusting screw which is positioned opposite said depth gauge.

13. The drilling tool as set forth in claim 11 characterised in that a rotary ring is provided between said fitment sleeve and a drilling chuck said drilling machine for setting said drill in accordance with a marking, said marking being preferably in the form of a notch.

14. The drilling tool as set forth in claim 1 characterised in that said fitment sleeve carries bracing supports means with different look-like configurations for different working operations.

15. The drilling tool as set forth in claim 1 characterised in that said actuating lever provides a step up transmission arrangement which increases the force acting on said lever to provide increased contact pressure between said drilling machine and said bracing support means.

* * * * *